US009964089B2

United States Patent
Kylström

(10) Patent No.: US 9,964,089 B2
(45) Date of Patent: May 8, 2018

(54) VALVE FOR A FUEL SYSTEM FOR A COMBUSTION ENGINE AND METHOD FOR CONTROLLING A FUEL SYSTEM FOR A COMBUSTION ENGINE

(71) Applicant: SCANIA CV AB, Södertälje (SE)

(72) Inventor: Kim Kylström, Tullinge (SE)

(73) Assignee: SCANIA CV AB (SE)

( * ) Notice: Subject to any disclaimer, the term of this patent is extended or adjusted under 35 U.S.C. 154(b) by 494 days.

(21) Appl. No.: 14/399,313

(22) PCT Filed: Apr. 10, 2013

(86) PCT No.: PCT/SE2013/050384
§ 371 (c)(1),
(2) Date: Nov. 6, 2014

(87) PCT Pub. No.: WO2013/172764
PCT Pub. Date: Nov. 21, 2013

(65) Prior Publication Data
US 2015/0136099 A1     May 21, 2015

(30) Foreign Application Priority Data

May 16, 2012 (SE) ...................... 1250500

(51) Int. Cl.
*F02D 41/22* (2006.01)
*F02M 63/00* (2006.01)
(Continued)

(52) U.S. Cl.
CPC ....... *F02M 63/0005* (2013.01); *F02D 41/221* (2013.01); *F02M 21/0242* (2013.01);
(Continued)

(58) Field of Classification Search
CPC .......... F02M 63/0005; F02M 63/0022; F02M 63/022; F02M 63/0017; F02M 63/0078;
(Continued)

(56) References Cited

U.S. PATENT DOCUMENTS 4,108,196 A * 8/1978 Calvert ................. F16K 5/0673
137/72
4,997,004 A * 3/1991 Barkhimer ........... F02M 47/027
137/596.17
(Continued)

FOREIGN PATENT DOCUMENTS

DE        100 58 010 A1    5/2002
DE    10 2007 000064 A1    8/2007
(Continued)

OTHER PUBLICATIONS

Extended European Search Report and European Search Opinion dated Dec. 10, 2015 in corresponding European Patent Application No. 13791077.4 (9 pages).
(Continued)

*Primary Examiner* — David Hamaoui
(74) *Attorney, Agent, or Firm* — Ostrolenk Faber LLP

(57) ABSTRACT

A valve (4, 4') for a fuel system for a combustion engine: A ball retainer (26) is provided with a cavity (28) to accommodate a ball (22). The ball (22) has a first seal surface (30) to cooperate with and abut sealingly against a seat (32). The ball retainer (26) has a secondary seal surface (34) to cooperate with and abut sealingly against the seat (32) when the ball (22) is not in the ball retainer (26). Also, a method for controlling a fuel system for a combustion engine.

12 Claims, 5 Drawing Sheets

(51) Int. Cl.
*F02M 47/02* (2006.01)
*F02M 61/16* (2006.01)
*F02M 21/02* (2006.01)
*F02M 37/00* (2006.01)
*F02M 63/02* (2006.01)
*F02D 41/38* (2006.01)

(52) U.S. Cl.
CPC .... *F02M 21/0293* (2013.01); *F02M 37/0023* (2013.01); *F02M 47/027* (2013.01); *F02M 61/166* (2013.01); *F02M 63/005* (2013.01); *F02M 63/0017* (2013.01); *F02M 63/0022* (2013.01); *F02M 63/0036* (2013.01); *F02M 63/0077* (2013.01); *F02M 63/0078* (2013.01); *F02M 63/022* (2013.01); *F02D 41/3836* (2013.01); *F02D 2041/227* (2013.01); *Y02T 10/40* (2013.01); *Y10T 137/7841* (2015.04)

(58) Field of Classification Search
CPC .......... F02M 21/0293; F02M 21/0242; F02M 37/0023; F02M 63/0077; F02M 41/221; F02M 63/0036; F02M 47/027; F02M 61/166; F02M 63/005; Y10T 137/7841; Y02T 10/40; F02D 2041/227; F02D 41/3836

See application file for complete search history.

(56) References Cited

U.S. PATENT DOCUMENTS

| | | |
|---|---|---|
| 7,987,835 B2 | 8/2011 | Eisenmenger |
| 2010/0313852 A1* | 12/2010 | Schnell ................ F02M 47/027 123/472 |

FOREIGN PATENT DOCUMENTS

| | | |
|---|---|---|
| DE | 10 2010 030 429 A1 | 12/2011 |
| EP | 0 851 115 A1 | 7/1998 |
| EP | 1 319 827 A2 | 6/2003 |
| EP | 2 444 652 A2 | 4/2012 |
| JP | H 10-9035 | 1/1998 |
| JP | 2010-116791 | 5/2010 |

OTHER PUBLICATIONS

International Search Report dated Sep. 2, 2013 issued in corresponding Internaitonal patent application No. PCT/SE2013/050384.

* cited by examiner

VALVE FOR A FUEL SYSTEM FOR A COMBUSTION ENGINE AND METHOD FOR CONTROLLING A FUEL SYSTEM FOR A COMBUSTION ENGINE

CROSS-REFERENCE TO RELATED APPLICATIONS

The present application is a 35 U.S.C. §§ 371 National Phase conversion of PCT/SE2013/050384, filed Apr. 10, 2013, which claims priority of Swedish Patent Application No. 1250500-4, filed May 16, 2012, the contents of which are incorporated by reference herein. The PCT International Application was published in the English language.

BACKGROUND OF THE INVENTION AND PRIOR ART

The present invention relates to a valve for a fuel system for a combustion engine and also to a method for controlling a fuel system for a combustion engine.

One way of reducing discharges of emissions from diesel engines is to inject fuel at high pressure into the combustion chamber, usually involving a so-called common-rail system. A common-rail system comprises a high-pressure pump which pumps fuel at high pressure to an accumulator tank situated between the pump and the engine's cylinders. The fuel in the tank is intended to be distributed to all of the cylinders. The fuel from the tank is injected into the combustion chambers of the respective cylinders by electrically operated fuel injectors. Fuel injectors have to be able to open and close very quickly and are operated by an electrical control unit which substantially continuously calculates the amount of fuel to be supplied to the respective cylinders on the basis of information from various engine parameters, inter alia engine load and engine speed.

A fuel system as above comprises valves provided with a sealing element in the form of a ball, a ball retainer and a seat. The ball may for example be made of ceramic material with a view to being wear-resistant. However, ceramic materials are brittle. Mishandling or such occurrences as a hard extraneous particle coming into contact with the ball when the valve is about to close may result in the ball disintegrating into a plurality of small fragments and being flushed away, leading to the valve no longer sealing.

If the valve serves as a safety valve in the fuel system and no longer seals, fuel will be led back to the fuel tank. If said valve is situated between the high-pressure pump and the fuel injectors, this means that the injectors will not be supplied with fuel in the same amount as previously, leading to the engine producing a lower power output or not receiving enough fuel to be able to operate.

Moreover, if the valve is in a fuel injector, the spring preloading which acts upon a valve retainer will decrease because of reduced preloading, also causing the valve not to be able to counteract such a large pressure as when the ball was in the valve and sealing against the seat. This leads to the valve no longer sealing, with the result that it is no longer possible to control the dosing of fuel into the engine's cylinders.

Uncontrolled fuel injection leads to overdosing of fuel in the cylinder, which means that the exhaust system will receive a large amount of unburnt fuel, with the potential consequence that the exhaust post-treatment system may be damaged and its service life be considerably reduced. When the engine is under heavy load, the fuel in the exhaust post-treatment system may also ignite, causing therein an undesirable temperature rise and thereby further damaging the exhaust post-treatment system and reducing its service life. The fuel consumption and the emissions in the exhaust gases will also increase.

There are various possible ways of detecting uncontrolled fuel injection, e.g. the engine's control unit may measure the exhaust temperature after an oxidation catalyst in the exhaust post-treatment system. If this temperature increases unreasonably quickly, it is very likely that uncontrolled injection has occurred. The engine's control unit may also measure the acceleration of the flywheel at each cylinder ignition. If any cylinder gives the flywheel a deviating acceleration, this too may indicate uncontrolled fuel injection. The engine's control unit controls the flow from the high-pressure pump to the fuel injectors. If the engine's control receives a signal from the pump to increase the flow abnormally sharply, this may likewise mean that uncontrolled fuel injection has occurred.

The measure currently employed to prevent reduced service life and damage to the exhaust post-treatment system when uncontrolled injection has been detected is to throttle the fuel supply to the fuel injectors, leading to the engine being switched off automatically. Alternatively, the driver is warned that a valve failure has occurred, leading to the driver switching off the engine. This is a major disadvantage in making it impossible to use the engine to run the vehicle to a workshop for remedial action.

An example of a known fuel injector and its function is referred to in SE-C2-529810. The injection means comprises a passage for receiving fuel at a first positive pressure, a pressure amplifier and an injection valve which can be put into an open position and a closed position. The injection valve comprises a piston element, a closing chamber and an opening chamber. When fuel is intended to be injected, the pressure amplifier generates a higher second fuel pressure in the opening chamber so that the piston element is moved towards an open position and fuel is injected. When the injection of fuel is to be halted, the high pressure in the opening chamber is reduced and the closing chamber is connected to said fuel source at the first pressure so that the valve is moved towards the closing position by a force provided jointly by the first pressure and said spring means.

Against the background of the above deficiencies of known valves, there is a need for a novel valve for fuel systems.

SUMMARY OF THE INVENTION

The object of the present invention is to propose for a fuel system a valve which performs a valve function despite a failure having occurred in the valve.

A further object of the present invention is to propose for a fuel system a valve which allows engine function despite uncontrolled fuel injection.

These objects are achieved with a valve for a fuel system and with a method for controlling a fuel system for a combustion engine according to the features disclosed herein.

Such a valve will perform a valve function despite a failure having occurred in the valve. In such cases the engine may still be used to run the vehicle to a workshop for replacement or repair of the valve or the fuel injector.

The ball retainer's cavity which forms part of the valve may be of various different shapes, e.g. spherical cupola shape or conical shape. The dimensions of the cavity are such that a substantial part of the ball is surrounded by it. If for example the cavity is of spherical cupola shape, the diameter of the sphere is greater than that of the ball.

A primary seal surface is provided at the contact surface between the ball and the seat. If for example the diameter of the ball is about 1.1 mm and a primary seal diameter is about 0.6 mm, the result is a primary seal pressure of about 3400 bar. Primary seal diameter means the diameter of the circle formed by the contact surface between the ball and the seat. When a failure has occurred in the valve, the ball retainer will abut sealingly against the seat instead of the ball, thus providing a secondary seal surface at the contact surface between the ball retainer and the seat. The ball retainer's seal surface against the seat will be larger than that of the ball against the seat, resulting in a lower seal pressure. The ball retainer's seal pressure will depend on its geometry. If a secondary seal diameter is about 1.22 mm, a secondary seal pressure will be about 730 bar. Secondary seal diameter means the diameter of the circle formed by the contact surface between the ball retainer and the seat. The secondary seal pressure decreases proportionally with larger ball diameter. The valve will thus not be able to counteract such a large pressure when a failure has occurred in the valve as when the ball was in the valve and tight against the seat. An unchanged fuel pressure will thus lead to the valve no longer sealing.

The valve may be situated at various points in the fuel system. It may for example be between the high-pressure pump and the fuel injectors to serve as a safety valve which opens in response to too high fuel pressure in the fuel system so that the pressure decreases, saving fuel injectors and other equipment in the fuel system from being damaged by too high a pressure. If when a failure has occurred in the valve the fuel pressure in the pump is reduced to below the ball retainer's seal pressure, the valve will still seal but at a pressure lower than normal fuel pressure during normal operation.

The valve may also be situated in a fuel injector. With the same detection of uncontrolled injection as in prior art it is possible to respond to uncontrolled injection by reducing the fuel pressure to below the ball retainer's pressure. The valve may then seal at a pressure below normal fuel pressure during normal operation, causing the fuel injectors to operate at a lower fuel pressure. The fuel pressure will nevertheless be sufficient to provide the cylinders with fuel and run the engine, making it possible to avoid switching the engine off. This makes it possible to run the vehicle at limited power output without damaging the engine or the exhaust post-treatment system.

Further advantages of the invention are indicated by the detailed description set out below.

BRIEF DESCRIPTION OF THE DRAWINGS

A preferred embodiment of the invention is described below by way of example with reference to the attached drawings, in which.

DETAILED DESCRIPTION OF THE INVENTION

Figure 1:
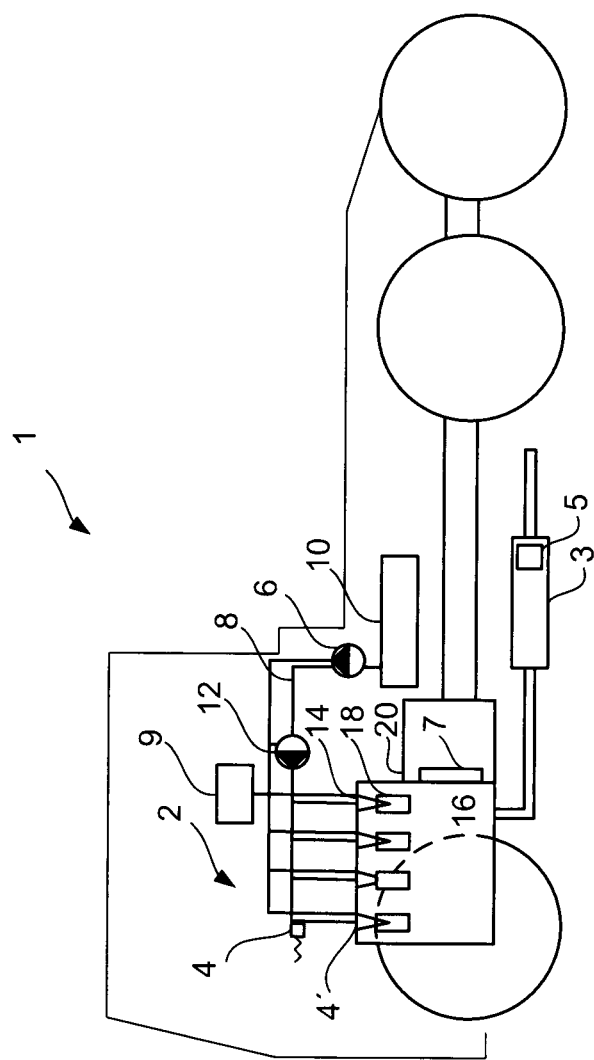
FIG. 1 is a schematic side view of a vehicle 1 provided with a valve for a fuel system according to the present invention, which valve is situated between the high-pressure pump and the fuel injectors and/or in a fuel injector.

Where possible, the same reference numerals are used in the description for the same or similar components.

FIG. 1 depicts a schematic vehicle 1 with a combustion engine 16 which comprises a number of cylinders 18. The engine is connected to a gearbox 20. A flywheel 7 is situated between the engine and the gearbox. The vehicle further comprises an exhaust post-treatment system 3 provided with an oxidation catalyst 5. The exhaust post-treatment system may in addition comprise in known ways various other components. An undepicted temperature sensor to monitor the exhaust temperature after the oxidation catalyst is situated close to the catalyst. The engine's cylinders 18 each further comprise a fuel injector 14 for injection of fuel. The fuel injectors are part of a fuel system 2 which also comprises valves 4, 4' according to the present invention. A low-pressure pump 6 is provided in a fuel line 8 to convey fuel from a fuel tank 10 to the engine 16 via a high-pressure pump 12. A control unit 9 is intended to control the operation of the low-pressure pump 6, the high-pressure pump 12 and the fuel injectors 14. In a first embodiment, the valve 4 is situated between the high-pressure pump and the fuel injectors. Each of the cylinders 18 is provided with a fuel injector 14 which in a second embodiment comprises the valve 4'. The engine is preferably a diesel engine. The fuel system 2 may for example be a common-rail system. The valve 4 may take the form of a safety valve which opens in response to too high a fuel pressure in the fuel system and thus lowers the pressure so that the fuel injectors and other equipment in the fuel system are not damaged by too high a pressure.

Figure 2:
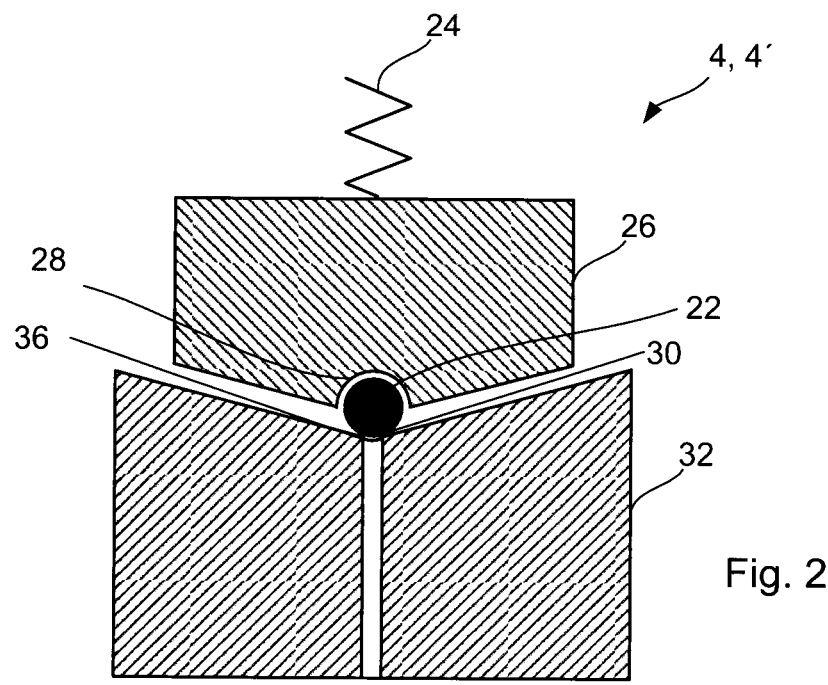
FIG. 2 is a sectional view of a valve provided with a ball according to the present invention.

FIG. 2 is a sectional view of a valve 4, 4' according to the present invention which comprises a spring 24 and a sealing element in the form of a ball 22. The ball is preferably made of hard and brittle material, such as ceramic material, e.g. aluminium oxide or silicon nitride. Other conceivable materials are stone material, e.g. industrially made diamonds, or a hardened steel material or a hardened polymer. A ball made of such material is highly resistant to wear. The ball may further be of substantially spherical shape, e.g. with a diameter of 0.5-2 mm. The valve 4, 4' comprises also a ball retainer 26 provided with a cavity 28 to accommodate the ball. The cavity may be of various shapes, e.g. a substantially spherical cupola shape or substantially conical shape. The dimensions of the cavity are such that a substantial part of the ball is surrounded by it. If for example the cavity has a spherical cupola shape, the diameter of the sphere will be larger than that of the ball. The ball further comprises a primary seal surface 30 which is situated at the contact surface between the ball and a seat 32 and intended to cooperate with and abut sealingly against the seat. The primary seal surface 30 is smaller than a secondary seal surface 34, as may be seen in FIG. 3, e.g. about 10% smaller. The primary seal surface may nevertheless be as large as or larger than the secondary seal surface. The valve 4, 4' further has a primary seal diameter. Primary seal diameter means the diameter of the circle formed by the contact surface between the ball and the seat. If for example the ball's diameter is about 1.1 mm and the primary seal diameter is about 0.6 mm, the result is a primary seal pressure of about 3400 bar. In both embodiments the valves 4, 4' may be in a common-rail system. In a first embodiment the valve 4 is situated between the high-pressure pump 12 and the fuel injectors 14. It may take the form of a safety valve which opens in response to too high a fuel pressure in the fuel system and thus lowers the pressure so that the fuel injectors and other equipment in the fuel system will not be damaged by too high a pressure. Each of the cylinders 18 is provided with a fuel injector 14 which in a second embodiment has a valve 4'.

Figure 3:
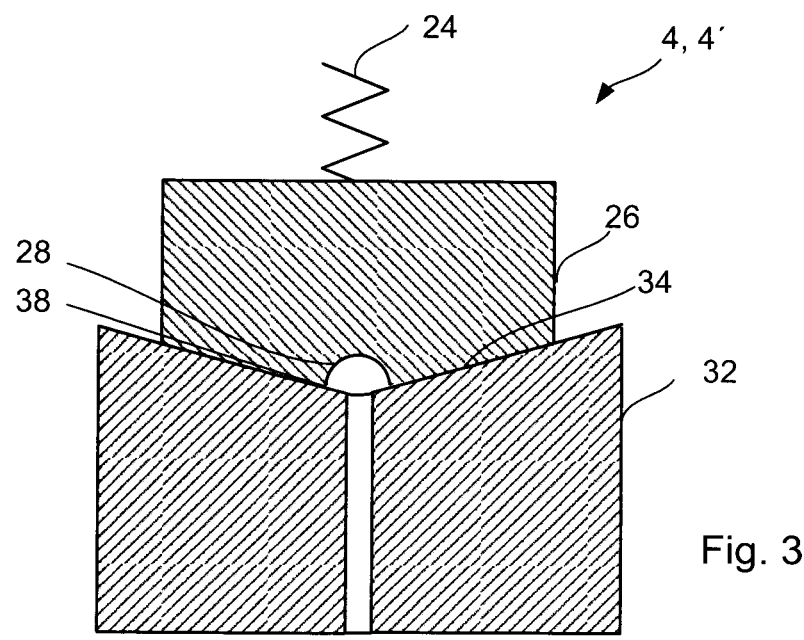
FIG. 3 is a sectional view of a valve according to the present invention with no ball.

FIG. 3 is a sectional view of a valve 4, 4' which does not have the ball 22 depicted in FIG. 2. The valve 4, 4' may be in a common-rail system. In the first embodiment the valve 4 is situated between the high-pressure pump 12 and the fuel injectors 14. The ball retainer 26 has a secondary seal surface 34 which is situated at the contact surface between the ball retainer and the seat 32 and intended to cooperate with and abut sealingly against the seat when there is no ball, e.g. after a ball failure. Ball failure may be due to mishandling or for example to a hard extraneous particle coming into contact with the ball when the valve 4, 4' is about to close, which may cause the ball to disintegrate into a plurality of small fragments and be flushed away. The secondary seal surface 34 is the contact surface between the ball retainer and the seat 32 when the ball 22 is absent. As the retainer is circular and has a central hole formed by the cavity 28, this contact surface 34 becomes ring shaped. The ball retainer's secondary seal surface 34 may be of substantially circular shape. The primary seal surface 30 depicted in FIG. 2 may be smaller than the secondary seal surface 34, e.g. about 10% smaller. The valve 4, 4' further has a secondary seal diameter, meaning the diameter of the circle formed by the contact surface between the ball retainer and the seat. The ball retainer's seal pressure, the so-called secondary seal pressure, will depend on its geometry. The secondary seal pressure decreases proportionally with larger diameter of the ball. If the secondary seal diameter is about 1.22 mm, the secondary seal pressure will be about 730 bar. The valve 4, 4' will thus not be able to counteract such a large pressure when a failure has occurred in the valve as when the ball was in the valve and sealing against the seat. An unchanged fuel pressure will therefore lead to the valve no longer sealing. If in response to a failure having occurred in the valve the fuel pressure in the high-pressure pump is reduced to below the ball retainer's seal pressure, the valve will still seal but at a pressure below the normal fuel pressure during normal operation. The fuel pressure will nevertheless be sufficient to provide the cylinders with fuel and run the engine, making it possible to avoid switching it off. This makes it possible to run the vehicle at limited power output without damaging the engine or the exhaust post-treatment system, as depicted in FIG. 1.

Figure 4:
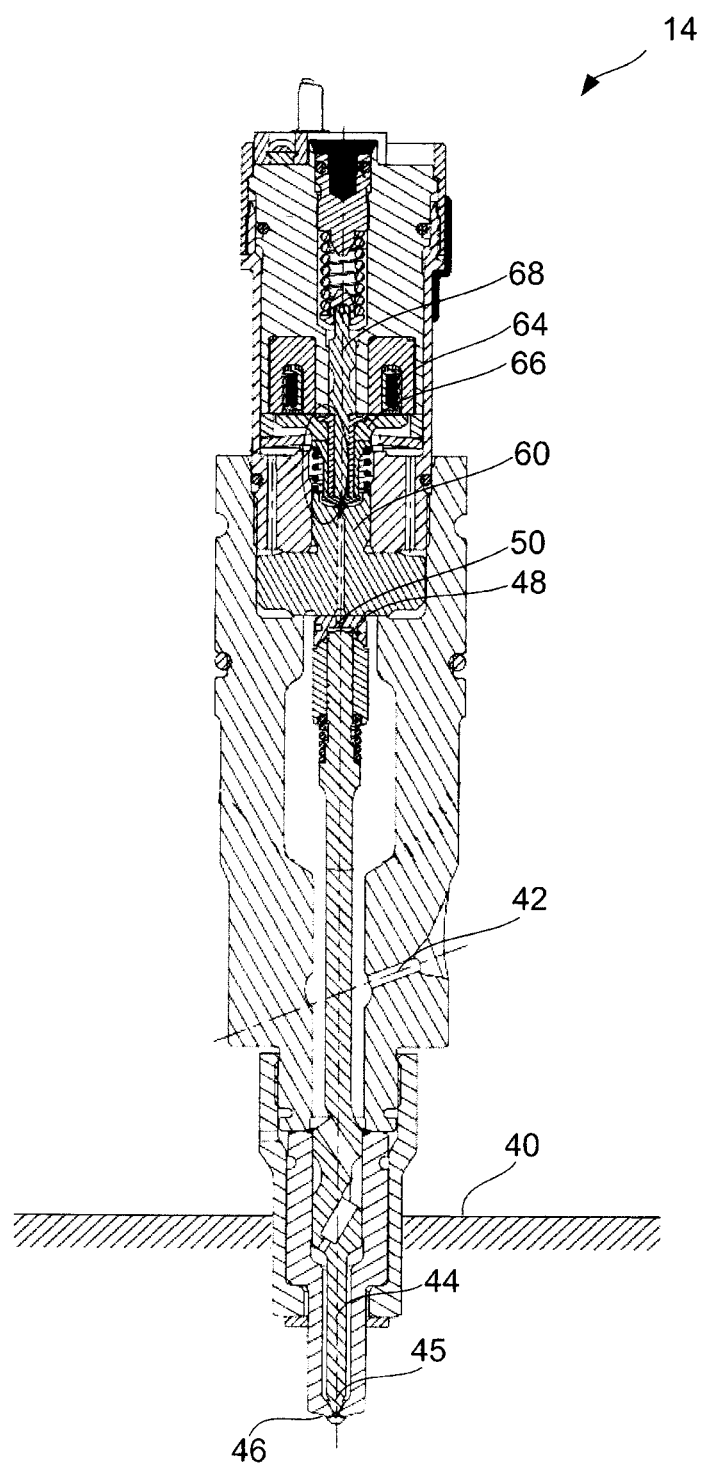
FIG. 4 is a sectional view of a fuel injector comprising a valve according to the present invention.
Figure 5:
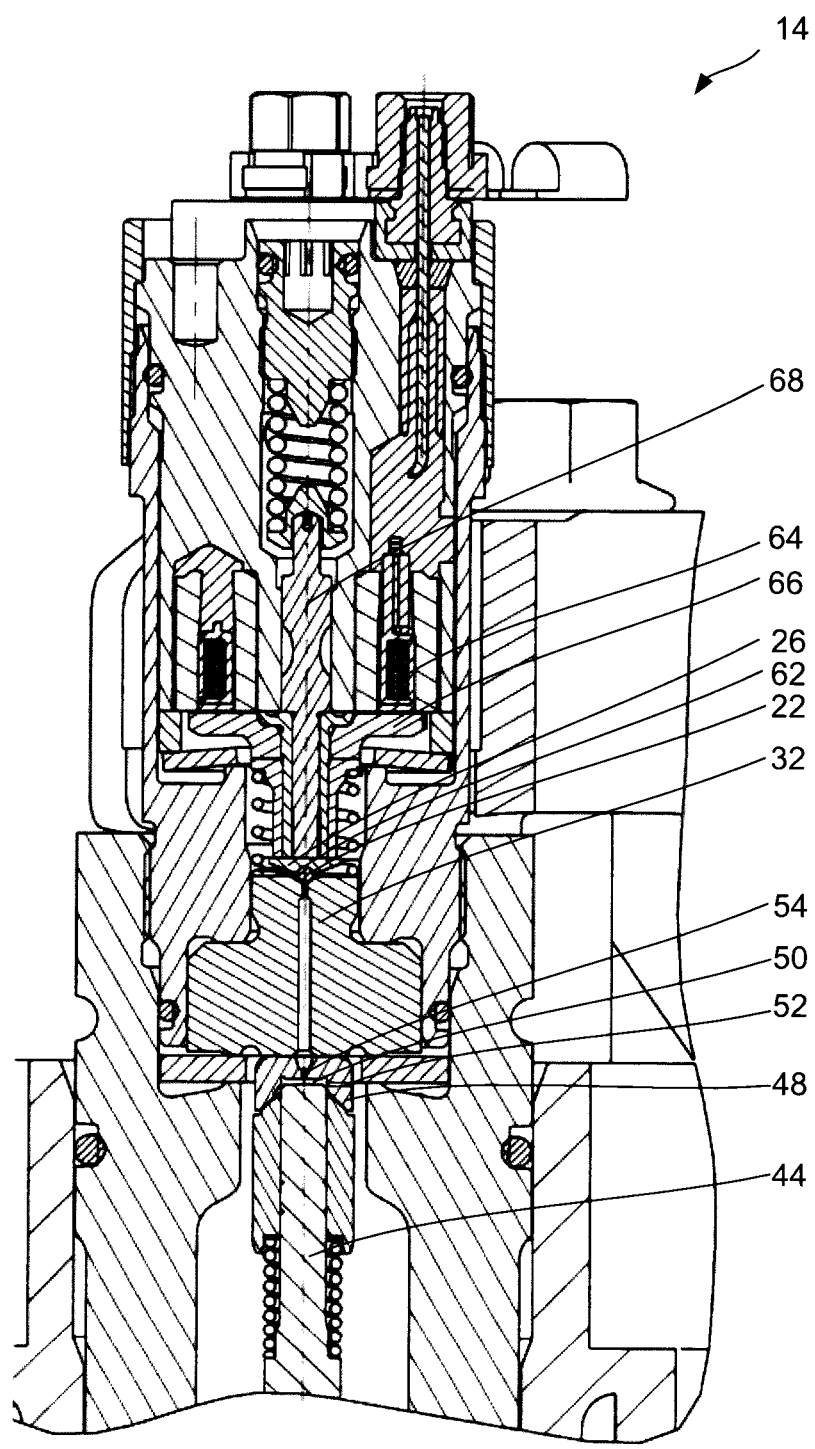
FIG. 5 is a sectional view of an upper part of a fuel injector provided with a valve according to the present invention.

FIGS. 4 and 5 are sectional views of a fuel injector 14 for injecting fuel at high pressure into a combustion chamber 40 in the engine 16. FIG. 5 is an enlarged sectional view of the upper part of the fuel injector in FIG. 4. Each of the cylinders 18 depicted in FIG. 1 is provided with a fuel injector. The engine is preferably a diesel engine in which the fuel injected is diesel oil. The lower part of the fuel injector is inserted in the engine's combustion chamber 40. Injecting fuel at high pressure reduces discharges of emissions from the engine. Other advantages during operation of the engine are also achieved when the fuel is injected at high pressure. Fuel is supplied at high pressure to the fuel injector 14 via an inlet pipe 42. The injector comprises a needle 44 and, at a lower part, an injection valve with a valve body in the form of a needle valve 45. The needle valve comprises an elongate portion with a narrowing end so shaped that it is possible to close outlet apertures 46 of the injector. The injector comprises also a cylinder element 48 presenting a control volume 50 which is limited by the needle's upper end and the cylinder element. The upper end of the needle can move into the control volume 50. The control volume is provided with an inlet throttle 52 and an outlet throttle 54. The inlet throttle has a smaller aperture than the outlet throttle, which means that the inlet throttle is more throttled than the outlet throttle. When fuel flows from the inlet throttle to the outlet throttle the pressure in the control volume will decrease. For fuel to be able to flow through the control volume, the valve 4' has to be opened, which is effected by activating an electromagnet 64. When the electromagnetic is activated, an anchor 66 is drawn towards it. The anchor raises a valve retainer 68, overcoming a spring force. The ball retainer 26 is situated at one end of the valve retainer. When the valve retainer has been raised, the ball retainer will rise from the seat 32, allowing fuel to pass through the valve 4' and return to the fuel tank. When fuel passes through the opened valve 4' it will flow through the control volume 50. The fuel pressure at the lower part of the needle 44 will cause the upper piston portion of the needle's elongate portion to move into the control volume so that the control volume decreases and the needle's narrowing portion moves upwards, with the result that the outlet apertures 46 open and fuel is injected in the combustion chamber 40. The fuel injector 14 may be part of a common-rail system. The ball has a first seal surface which is situated at the contact surface between the ball and the seat and intended to cooperate with and abut sealingly against the seat. The valve 4' further has a primary seal diameter, meaning the diameter of the circle formed by the contact surface between the ball and the seat. The ball retainer has a secondary seal surface which is situated at the contact surface between the ball and the seat and intended to cooperate with and abut sealingly against the seat when there is no ball, e.g. after a ball failure, as described above.

Figure 6:
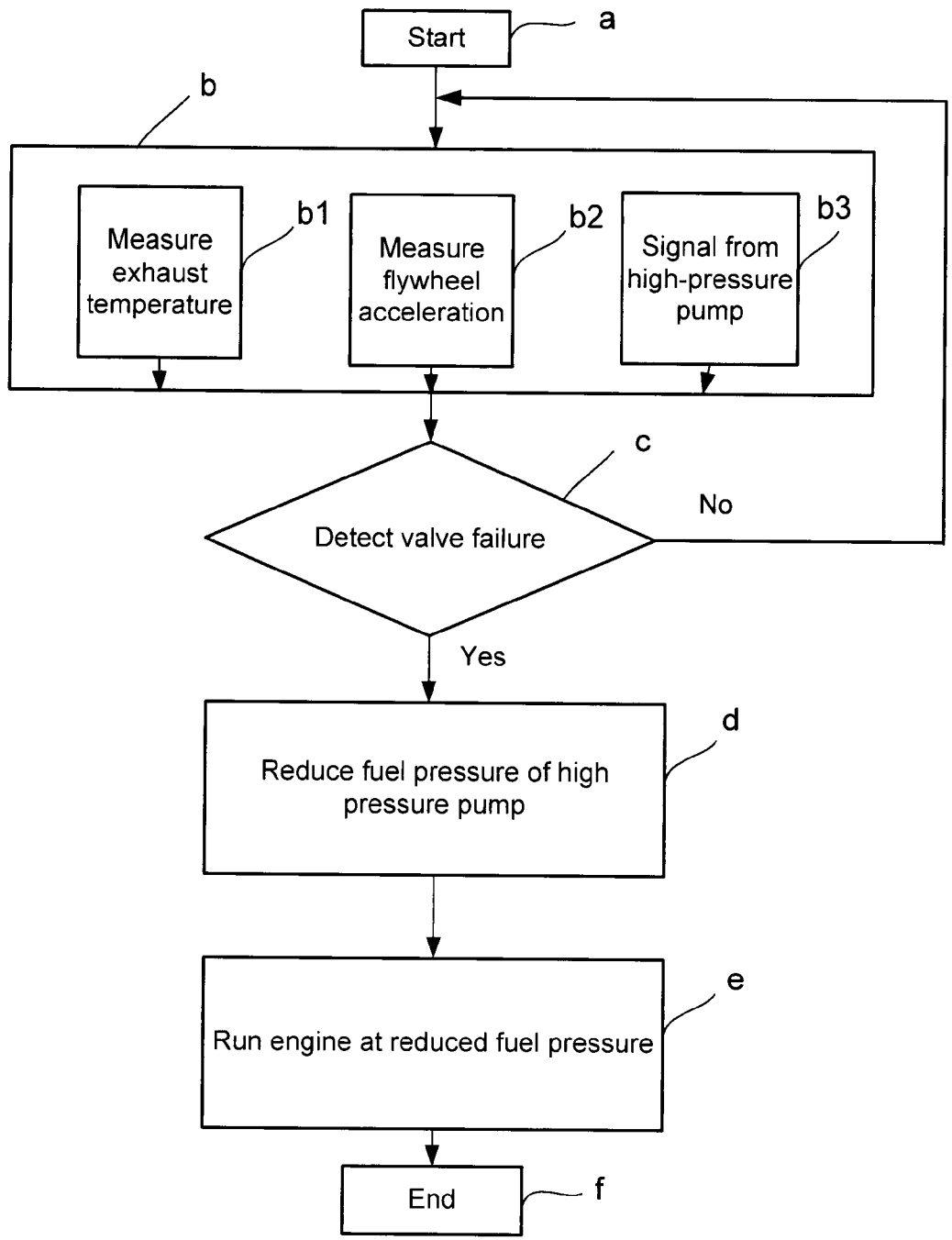
FIG. 6 is a flowchart for a method for controlling a fuel system for a combustion engine.

FIG. 6 illustrates a method for controlling the fuel system according to the invention. It starts with a first step a.

At a next step b signals are received from various sensors with a view to detecting a failure having occurred in the valve 4, 4'. These signals are compared with reference values with a view to detecting whether the signal values deviate from normal values. One way of conducting this may be to measure at a step b1 the exhaust temperature after an oxidation catalyst 5 in an exhaust post-treatment system 3 and decide whether it presents an abnormal value. Another way may be to make at a step b2 a measurement of the acceleration of the engine's flywheel at each cylinder ignition and decide whether it presents an abnormal value. As an alternative, another way of measuring the acceleration of the engine's speed is to use sensors intended for the purpose or other similar means. A further way may be to receive at a step b3 a signal directly from the high-pressure pump 12 or its control system 9 which indicates a fault. With advantage, more than one or all of these ways at steps b1, b2, b3 may be used to indicate a valve failure.

A next step c detects whether any of the signals at the preceding step b has indicated a valve failure.

If no valve failure is indicated, renewed monitoring takes place in a continuous loop.

If it is detected at step c that a valve failure has occurred, a next step d effects a reduction of the fuel pressure generated by the high-pressure pump 12 to below a seal pressure provided by the abutment of the ball retainer 26 against the seat 32.

At a following step e, the engine 16 is run at a reduced fuel pressure. This means that the engine can still run at reduced power output, but does allow the vehicle to be driven to a workshop for remedial action to rectify the fault.

The method then ends at a concluding step f. After the fault has been rectified, the method may resume from the starting step a.

The invention is in no way restricted to the embodiments described but may be varied freely within the scopes of the claims. Cited components and features indicated above may within the scope of the invention be combined between different embodiments cited.

The invention claimed is:

1. A valve for a fuel system for a combustion engine comprising:
   a ball;
   a ball retainer having a cavity configured and operable to accommodate the ball;
   a seat opposing the cavity and configured to abut and seal against the ball,
   the ball has a first seal surface configured to cooperate with and to abut sealingly against the seat with a first seal pressure to provide a seal for a first fuel pressure;
   the ball retainer has a secondary seal surface configured to cooperate with and abut sealingly against the seat with a secondary seal pressure to provide a seal for a second fuel pressure when the ball is not in the ball retainer,
   wherein the first seal surface is smaller than the secondary seal surface,
   wherein the first seal surface is a contact surface between the ball and the seat, and the second seal surface is a contact surface between the ball retainer and the seat, wherein the secondary seal pressure is below a value needed to counteract the first fuel pressure counteracted by the first seal pressure, and
   wherein the first fuel pressure and the second fuel pressure are sufficient to provide fuel to run the combustion engine.

2. A valve according to claim 1, further comprising the ball is made of a hard and brittle material.

3. A valve according to claim 1, wherein the ball is made of one of ceramic material, stone material, steel material and a polymer.

4. A valve according to claim 1, further comprising the ball is of a spherical shape.

5. A valve according to claim 4, wherein the ball has a diameter of the ball of 0.5-2 mm.

6. A valve according to claim 1, further comprising the cavity is of a spherical cupola shape.

7. A valve according to claim 1, further comprising the cavity is of a conical shape.

8. A valve according to claim 1, wherein the secondary seal surface of the ball retainer is of circular shape.

9. In combination, a valve according to claim 1, and a common-rail system in which the valve is situated.

10. In combination, a valve according to claim 1, and a fuel injector in which the valve is situated.

11. A valve according to claim 1, wherein the valve takes the form of a safety valve.

12. In combination, a valve according to claim 1, and further comprising a high-pressure pump and at least one fuel injector between which the valve is situated.

* * * * *